United States Patent [19]

Soref

[11] Patent Number: 5,044,712
[45] Date of Patent: Sep. 3, 1991

[54] WAVEGUIDED ELECTROOPTIC SWITCHES USING FERROELECTRIC LIQUID CRYSTALS

[75] Inventor: Richard A. Soref, Newton Centre, Mass.

[73] Assignee: The United States of America as represented by the Secretary of the Air Force, Washington, D.C.

[21] Appl. No.: 551,099

[22] Filed: Jun. 29, 1990

[51] Int. Cl.$^5$ ............................................. G02F 1/135
[52] U.S. Cl. ............................. 350/96.14; 350/96.15; 350/331 R; 350/347 V; 350/350 R
[58] Field of Search ............... 350/96.12, 96.13, 96.14, 350/96.15, 96.16, 331 R, 347 R, 347 V, 350 R, 350 S

[56] References Cited

U.S. PATENT DOCUMENTS

| | | | |
|---|---|---|---|
| 4,201,442 | 5/1980 | McMahon et al. | 350/96.14 |
| 4,690,489 | 9/1987 | Neyer | 350/96.14 |
| 4,746,183 | 5/1988 | Soref et al. | 350/96.14 |
| 4,749,258 | 6/1988 | Baker | 350/331 R |
| 4,813,771 | 3/1989 | Handschy et al. | 350/350 S |
| 4,836,657 | 6/1989 | Gunji et al. | 350/350 S |

Primary Examiner—John D. Lee
Attorney, Agent, or Firm—Robert L. Nathans; Donald J. Singer

[57] ABSTRACT

A tiny, high speed, low cost electrooptic switch is provided having co-planar waveguides of silicon oxynitride and a ferro-electric liquid crystal layer overlying the waveguides. A voltage source causes the molecular optic axis of the liquid crystal to rotate 45–90 degrees within the plane of the liquid crystal layer to cause a change of state of the switch.

15 Claims, 4 Drawing Sheets

WAVEGUIDED ELECTROOPTIC SWITCHES USING FERROELECTRIC LIQUID CRYSTALS

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of electrooptic switches for switching beams of light.

It is known to employ liquid crystals (LC) in conjunction with optical waveguides for switching light. See, for example, U.S. Pat. No. 4,201,442 issued to McMahon and Soref. That patent is not directed to the use of ferroelectric liquid crystals and uses out-of-plane crossover of two channels. The optic axis of the LC molecules goes from an in plane ordering to an out-of-plane ordering when voltage is applied, in contrast with the LC molecular axis remaining in the plane of the LC for both switching states in accordance with the present invention. In this prior art patent, light is allowed to leak out of one channel and into a second vertically stacked channel by raising the cladding index, so that the difference between the cladding index of refraction and the core index approaches zero, and the resulting leaky out-of-plane coupling only allows partial switching in practice and the largest transfer of light may be fifty percent.

Thus there is a need for an electrooptic LC switch having an active length of about one mm. and an overall switch length of about 2–3 mm, capable of complete switching with 100% exchange of signals. The switch of the McMahon and Soref patent is non-interferometric in nature, in contrast with preferred embodiments of the present invention.

There is also a need for an LC switch that has a ten microsecond response in contrast with far slower prior art nematic LC switches, with 15 volt, low current switching signals, and which may be used to construct low-loss monolithic switching networks that can be scaled to 32×32 switches at a wavelength of operation range between 0.5–1.8 microns, and which may be end-fire coupled to couple them to optical fibers without the use of costly prisms. It is true that deflecting-mirror switches respond in the microsecond range, but it is difficult to scale such a switch to large sizes. Semiconductor and LiNbO$_3$ switches respond in nanoseconds, but the fabrication technology is complicated and costly; hence the need for a simple, low cost, reliable technology that can be implemented in large switching arrays such as 32×32 arrays.

BRIEF SUMMARY OF ONE EMBODIMENT OF THE INVENTION

The aforesaid needs may be met in accordance with the teachings of the present invention. A presently preferred embodiment uses a ferroelectric liquid crystal (FLC) as a cladding layer positioned over a pair of coplanar waveguide portions of silicon oxynitride (SiON) having a core index of between 1.65–1.70. The lower initial cladding index of about 1.50 is switched so that its index approaches the core index, to in turn induce a substantial phase shift of coherent light within one of the waveguides, to switch the light from a first output port to a second output port. A pair of light transmissive indium tin oxide (ITO) electrodes apply switching voltages to the FLC material to change the orientation of the aligned FLC molecules which are initially parallel to the light propagation waveguide longitudinal axes. Upon the application of 15 volts, the rotation of the molecular axes of the FLC molecules is between 45–90 degrees, and such rotation is within the plane of the FLC cladding layer, a plane that is parallel with respect to the plane of the side-by-side waveguides. Such rotation causes the switch to change state.

BRIEF DESCRIPTION OF THE DRAWINGS

Other objects, features, and advantages of the invention will become apparent upon study of the following description taken in conjunction with the drawings in which.

DESCRIPTION OF PREFERRED EMBODIMENTS OF THE INVENTION

Figure 1:
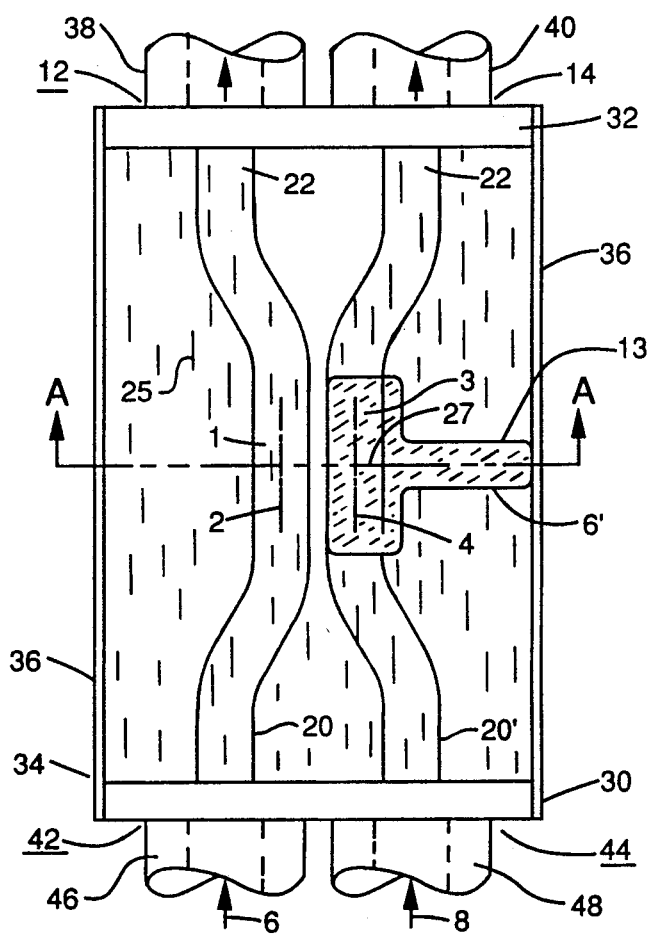
FIG. 1 shows a plan view of a two-by-two $\Delta\beta$ switch embodying the invention.

The first embodiment to be described is a directional coupler consisting of two identical single-mode waveguide cores that are evanescently coupled over a given coupling length in a central switch portion shown in FIG. 1. Control electrode 3 covers one core over that coupling length. When the voltage on electrode 3 changes, the propagation velocity of one waveguide portion changes significantly by an amount $\Delta\beta$, which produces switching.

Figure 2:
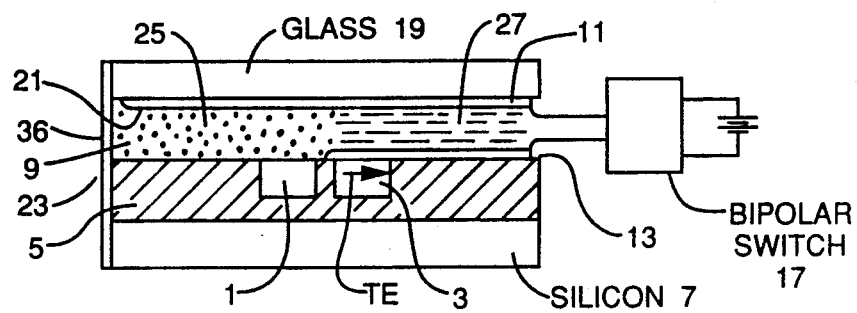
FIG. 2 shows a sectional view taken along A—A of FIG. 1.

As shown in FIGS. 1 and 2, the structure of the first embodiment consists of waveguide core portions 1 and 3 for switching light beams 6 or 8 between output ports 12 and 14. The light beams propagate along waveguide axes 2 and 4 which define longitudinal waveguide axes at central portions of the switch. The core portions are in a coplanar side-by-side relationship and are embedded within a silicon dioxide lower cladding dielectric layer 5, having a refractive index of about 1.5, which is grown upon a flat polished silicon wafer 7.

Upper FLC cladding layer 9 is sandwiched between thin ITO electrode layers 11 and 13, where 11 is deposited on the entire lower surface of glass plate 19 and where electrode 13 is deposited on the top of the core layer 3 and the right hand portion of layer 5 as shown. FLC liquid cladding layer 9 is contained within the sandwich by two micron thick glass spacers, 30 and 32 and seals 36, shown in FIG. 1. Voltage supply means comprises voltage source 15 connected to the electrodes via switch 17. Upper electrode 11 is the common electrode which overlies substantially the entire surface of the switch, whereas localized electrode 13 covers an area of only about 10–30 percent of the waveguide core portions as shown in FIG. 1.

The SiON waveguide material 1 and 3 is deposited to a thickness of about five microns, comparable to the core diameter of a single mode glass fiber, and is thus appropriate to support only the lowest order guided mode in the switch. The SiON waveguide material is a low loss dielectric material resembling glass. The use of this material is deemed to be highly desirable, since its refractive index can be adjusted easily in the 1.6–1.8 range by changing the ratio of silicon dioxide to $Si_3N_4$ during the growth of the oxy-nitride film. Thus, we can readily tailor the refractive index of the guided mode to be slightly higher (0.02) than the extraordinary index of the FLC cladding.

Conventional photolithographic masking and etching is used to define the waveguide shapes in the SiON such as coupled channels, interconnected channels, etc. Next, a planarizing layer 5 of dielectric material such as silicon dioxide is deposited in all the open spaces between the core portions so as to embed the core portions and to create a flat layer with only the top surfaces of the cores exposed. ITO electrode layer 13 is thereafter deposited over the waveguide core 3 as shown in FIGS. 1 and 2, and has a thickness of about 600 angstroms or less, so that light may tunnel through the electrode and will be mainly influenced by the FLC cladding layer rather than the index of the ITO layer which is about 1.9. Photolithography is used to define the small localized rectangles of electrode 13 as shown in FIG. 1, overlying a centralized core portion 3, or, as will be shown later, a plurality of waveguide portions, or portions between waveguides, and leadout pads 6, that go to the edges of the switches to be coupled to voltage source 15, via polarity reversing or bipolar switch 17. Switch 17 applies −15volts across the FLC layer in a first state of the switch or +15 volts to change the state of the switch. Thus source 15 and the electrodes define a voltage supply means for changing the cladding index of refraction to change the switch state.

Figure 3:
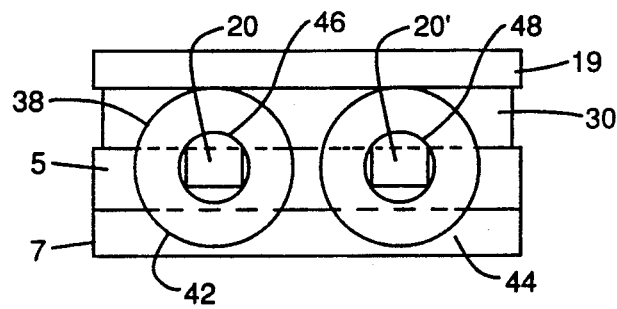
FIG. 3 shows an end view of the switch of FIG. 1.

Before adding the FLC liquid, a capsule for containing the liquid is formed by placing the top glass plate 19, previously coated by the large area electrode 11, over glass spacers 30 and 32, shown in FIGS. 1 and 3, the spacers having a thickness of about 1–2 microns. Thus, the cladding layer will have a like thickness of 1–2 microns. Before final assembly, the upper and lower electrode surfaces and the exposed core and $SiO_2$ surfaces are treated to produce a uniform, uniaxial order of the FLC as indicated at 21 and 23. Such treatments are within the skill of the art. "Displaytech" Corp. of Boulder, Colo. has been using this treatment on electrodes used in electrooptic switches. The resulting plane parallel capsule is thereafter sealed over most of its perimeter, indicated by 36, the FLC is added and the FLC takes on a stable, uniaxial orientation, which is parallel to the longitudinal axis 4, extending in the direction of the propagation of light through the waveguide core portions.

Since TM polarized light would always be perpendicular to any in plane order of the FLC, that polarization is not useful. The TE-like polarization, which is parallel to the plane of the switch structure, is used because in one state the FLC axis is oriented substantially perpendicular to the optically guided polarization, and in the other state, the FLC axis may be oriented substantially parallel to the optical polarization over the active area underlying the localized electrode 13. The unaddressed areas of the FLC layer will always be in the 0° state.

Thus the coplanar optical channel waveguide core portions 1 and 3 support guided modes of light polarized substantially parallel to the plane of the waveguide portions as indicated by arrow TE in FIG. 2. The molecular optic axis of the FLC cladding is initially aligned with light propagation axis 4 and is perpendicular with respect to the polarized TE light, which experiences an ordinary index of 1.50. The application of +15 volts via bipolar switch 17, causes the molecular optic axis to rotate through a particular effective angle of rotation of between 45–90 degrees, which depends upon the nature of the chemical formulation of the FLC material, as is known in the art. If this angle of rotation is ninety degrees, the molecular axis will now be parallel to the TE polarized light which will experience the extraordinary FLC index of refraction of 1.65. Should the angle of rotation be forty-five degrees, the light will experience an index of about halfway between 1.50 and 1.65, say 1.58.

Thus the effective cladding index seen by the TE polarized light will be between 1.58–1.65 depending upon the FLC chemical formulation. Subsequent application of −15 volts will cause the switch to revert to the first state. The two molecular FLC orientations (0 and 45–90 degrees) with respect to propagation axis 4, will lie in the plane of cladding layer 9, as shown by 25 and 27. These orientations define bi-stable states so that the first and second voltage levels need only be applied to change the state of the optical switch and thus need not be continuously applied. The waveguide core index of refraction is typically within a first range of between 1.65 and 1.70. We choose the waveguide index to be equal to or slightly larger than the extraordinary cladding index, so that light is confined in all circumstances.

The thin transparent ITO electrode 13 enables the waveguide portions to be evanescently optically coupled to the cladding layer. Waveguide theory shows that the aforesaid voltage induced change in the cladding index will change the effective index of the guided modes in the adjacent, coplanar waveguide portions. In the aforesaid case of a change in the cladding index of 0.08–0.15, theory indicates that the effective change in the waveguide index will be about 0.001, which is sufficient to produce $\tau$ radians of optical phase shift in a propagation length of about 0.5–1 mm in the waveguide, depending on the wavelength of light passing therethrough. Hence, we can construct switches and modulators with an active length of about one mm. The overall switch length including lead-in and lead-out waveguides 20 and 22 respectively, would be about 2–3 mm.

Light may be readily coupled into the ends of the aforesaid switch to couple it to input fibers 46 and 48 at input port 42 and 44. Likewise output fibers 38 and 40 are end-fire coupled to output ports 12 and 14, as shown in FIG. 1. In the end view of FIG. 1 shown in FIG. 3, lead-in channels 20 and lead-out channels 22 are shown embedded in dielectric layer 5, upon silicon base 7. As mentioned above, the height and width of the channel core portions are about five microns. When an optical fiber such as 42 is joined to the side of the switch, the five micron diameter of the core of the optical fiber will be of a cross sectional area of a comparable size relative to the cross-sectional area of the adjacent channel waveguide 20 as shown in FIG. 3. The fibers could also be butt-coupled to the ends of the switch by the use of clear optical index matching cement.

Figure 4A:
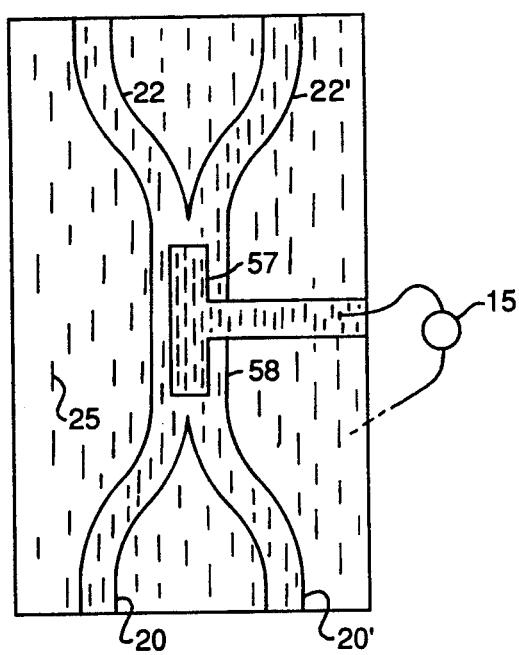
FIGS. 4a, 4b, and 4c illustrate a switch having a double width channel.
Figure 4B:
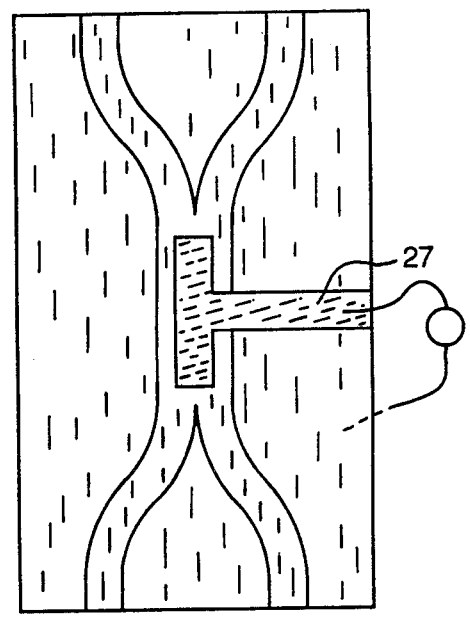
Figure 4C:
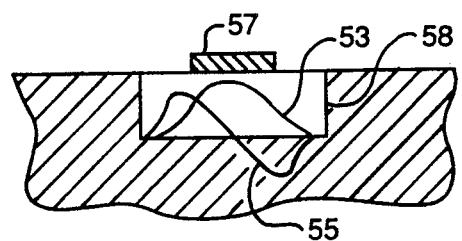

The worker in the art will appreciate that networks of these switches may be formed into large NxN, lxN, Nxl networks. See for example U.S. Pat. No. 4,787,692 to Spanke. The two-by-two switch of FIGS. 4a, 4b, and 4c is an interferometric device in which two single mode channels merge into a double-width channel; this structure is sometimes called a zero-gap coupler. As indicated in FIG. 4c, the merged region 58 supports a symmetric optical mode 53 and an antisymmetric mode 55. The control electrode 57 has a width half as large as the width of the central channel 58. The electrode width and position imply that the symmetric mode, but not the antisymmetric mode, will be strongly perturbed by the aforesaid voltage induced change in the cladding index. As a result, the two modes will become 180 degrees out of phase over the switching length upon a change in the voltage level, changing the state of the switch. Various other portions of the switch correspond to the switch of FIG. 1 and 2, and thus bear similar reference numerals.

Figure 5:
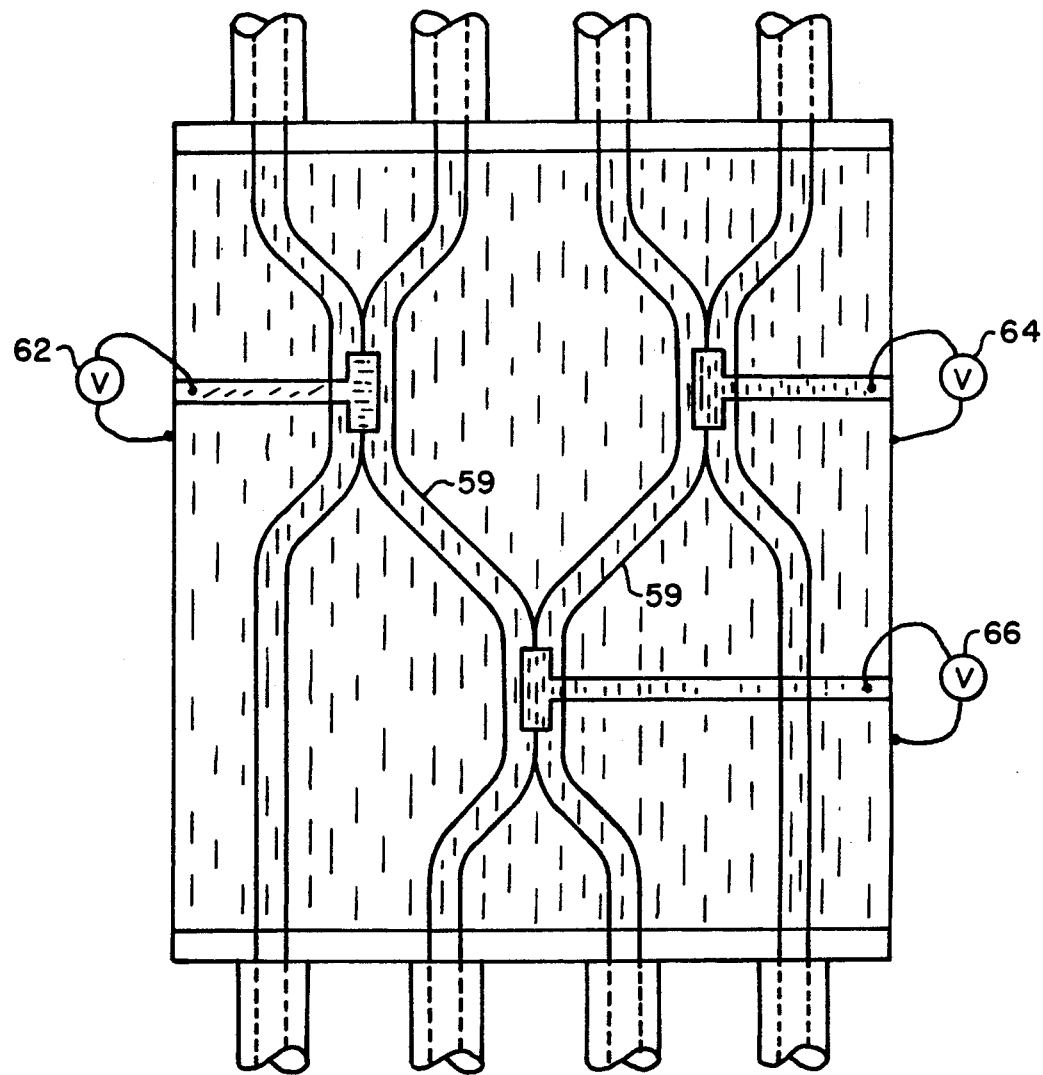
FIG. 5 shows a monolithic network of the switches of FIGS. 4a and 4b.

The structure of FIG. 5 is one of many possible switching networks incorporating the present invention. Three of the two-mode-interference switches of FIGS. 4a, 4b, and 4c have been joined by interconnecting waveguides 59, into a monolithic network, and each switch has an independent switched voltage source, 62, 64, and 66. As shown, the inputs of the array are coupled to four optical fibers, while the outputs connect to four fibers.

Figure 6:
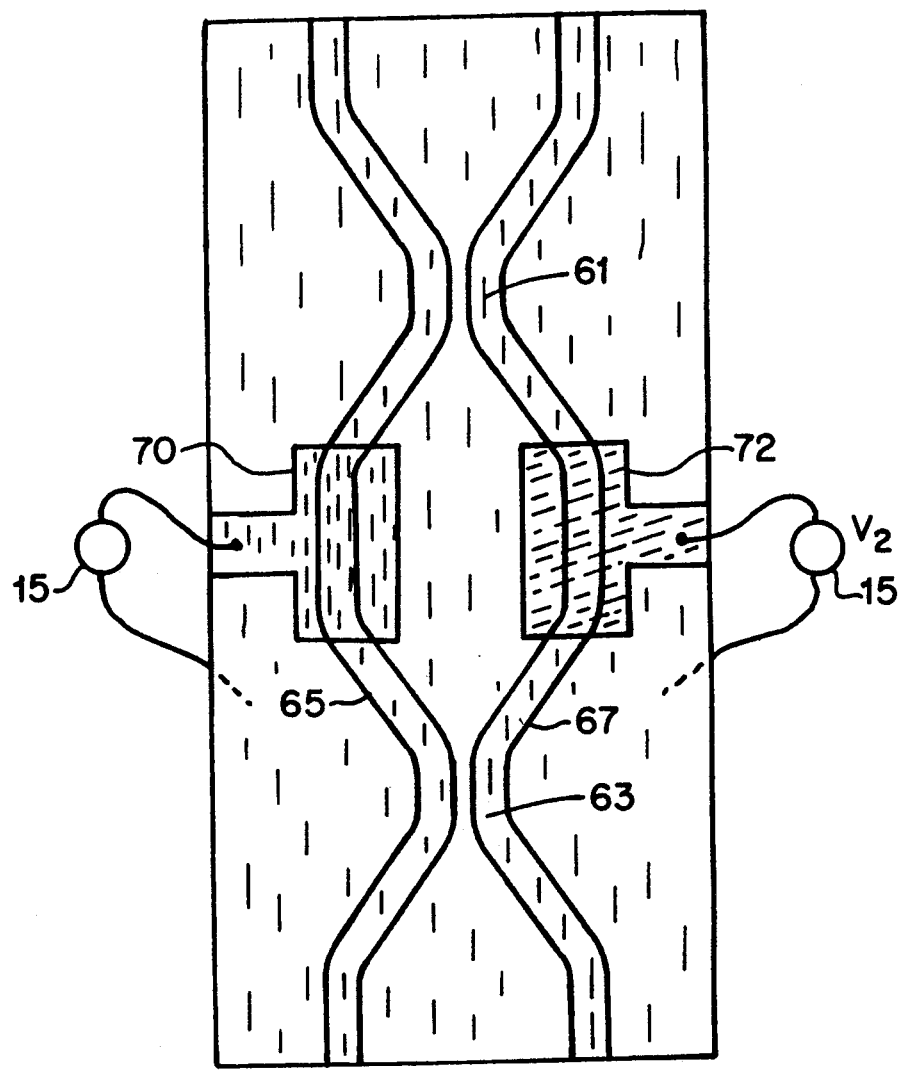
FIG. 6 shows a two-by-two balanced bridge switch.

The structure of FIG. 6 is a two-by-two balanced bridge switch: an optical interferometer consisting of identical single-mode channels that are coupled in two locations, by three dB couplers 61 and 63, which are known in the art, and which are separated by equal-path arms of the interferometer 65 and 67. Each arm is covered by the aforesaid localized electrode 70 and 72 and the FLC cladding layer to change the phase of the light as previously described. Constructive interference at one output port occurs when the FLC cladding over both arms is oriented at zero degrees. The applied voltage can change the phase shift in either arm by 180 degrees, thereby inducing cross/bar switching. This teaching can also be used in a Mach-Zehnder intensity modulator, a one-by-one device, in which a phase modulation in one or both arms, as in FIG. 6, produces an amplitude modulation of light at the output.

In accordance with the present invention, a pair of localized electrodes can be positioned on the two output branches of an X-shaped channel waveguide structure, similar to the lithium niobate structure taught by Silberberg in U.S. Pat. No. 4,775,207, in which the input branches have a different width. This is a mode evolution switch that does not use interference in the conventional sense.

Another FCL switch, not illustrated here, is the variable-coupling switch or $\Delta k$ switch wherein an elongated FCL cladding electrode is positioned in the intercore gap of a directional coupler like the FIG. 1 coupler. The coupling strength between the two guides changes significantly when the FCL cladding state changes, thereby producing switching.

A multi-mode switch similar to the switch of FIG. 4 can be constructed in which the thin, central electrode acts as a partial or total reflector of multi-mode light.

Other embodiments will occur to the skilled worker in the art and thus the scope of the invention is to be limited only by the terms of the following claims and art recognized equivalents.

I claim:

1. An electro-optic switch comprising:
   (a) coplanar light transmissive optical channel waveguide core portions for supporting guided modes of light polarized substantially parallel to the plane of the waveguide core portions, said waveguide core portions having a longitudinal light propagation axis and a core refractive index within a first range;
   (b) a cladding layer having an initial ordinary index of refraction overlying a waveguide core portion and evanescently optically coupled thereto and comprising a substantially uniformly ordered layer of ferroelectric liquid crystal (FLC) having a cladding index of refraction which increases from said initial index of refraction in response to a change in voltage applied thereto, causing said cladding index to assume an index within a second range, lower than the first range of the refractive core index of said waveguides and not overlapping said first range; and
   (c) voltage supply means for impressing a voltage across said cladding layer of a magnitude to cause the cladding index of said cladding layer to be increased to a sufficient extent to change the effective index of refraction of the guided modes within said core portion.

2. The electro-optic switch of claim 1 wherein said voltage supply means includes electrode means for establishing an initial molecular state of said FLC upon the application of a first voltage level across said cladding layer wherein the molecular optical axis of the ferroelectric liquid crystal is oriented at an initial angle of zero degrees with respect to the longitudinal light propagation axis of said waveguide portions and wherein said voltage supply means applies a second voltage level across said cladding layer for causing an in-plane change in the initial ferroelectric liquid crystal molecular optical axis from said initial angle of zero degrees to an effective angle of rotation of between 45-90 degrees, for in turn substantially increasing the local cladding index.

3. The switch of claim 1 wherein the first range of the core index of refraction is between 1.65 and 1.70 and wherein the second range of the cladding index of refraction is between about 1.58 and 1.65, and wherein said cladding layer has an initial ordinary index of refraction of about 1.50.

4. The switch of claim 2 wherein the first range of the core index of refraction is between 1.65 and 1.70 and wherein the second range of the cladding index of refraction is between about 1.58 and 1.65.

5. The switch of claim 2 wherein said cladding layer has a thickness of 1-2 microns.

6. The switch of claim 3 wherein said cladding layer has a thickness of between 1-2 microns.

7. The switch of claim 2 wherein one electrode of said electrode means is thin enough to permit light from a channel waveguide core portion to tunnel therethrough and into said cladding layer.

8. The switch of claim 4 wherein one electrode of said electrode means is thin enough to permit light from a channel waveguide core portion to tunnel therethrough and into said cladding layer.

9. The electro-optic switch of claim 7 or 8 wherein said one of said electrode means comprises a layer of indium tin oxide having a thickness of about 600 angstroms or less.

10. The switch of any one of claims 2-8 wherein said cladding layer overlies all waveguide core portions, said cladding layer being substantially uniformly ordered in the ordinary index state, and wherein a portion of said electrode means overlies only localized areas of said waveguide core portions, said localized areas being substantially smaller than the total areas of said waveguide core portions.

11. The switch of any one of claims 2-8 wherein said first voltage level is about −15 volts and said second voltage level is about +15 volts.

12. The switch of any one of claims 1-8 including a planarized layer of a dielectric material having a refractive index of about 1.5 in which said waveguide core portions are embedded, said dielectric material being grown upon a silicon substrate.

13. The electro-optic switch of any one of claims 1-8 wherein said waveguide core portions are made of silicon oxynitride.

14. The electro-optic switch of any one of claims 1-8 wherein said electro-optic switch is configured as a switch selected from the group consisting of two coupled single-mode waveguides, two intersecting waveguides, a two-by-two delta-beta switch, a two-by-two two-mode-interference switch, a two-by-two delta-k switch, a two-by-two mode evolution switch, a two-by-two balanced-bridge switch, a Mach-Zehnder intensity modulator and a multimode X-switch.

15. The electro-optic switch of any of claims 1-8 wherein the thickness of said waveguide portions is about five microns.

* * * * *